No. 758,067. PATENTED APR. 26, 1904.
G. L. HARVEY.
FRICTION DEVICE.
APPLICATION FILED DEC. 26, 1903.
NO MODEL. 2 SHEETS—SHEET 2.
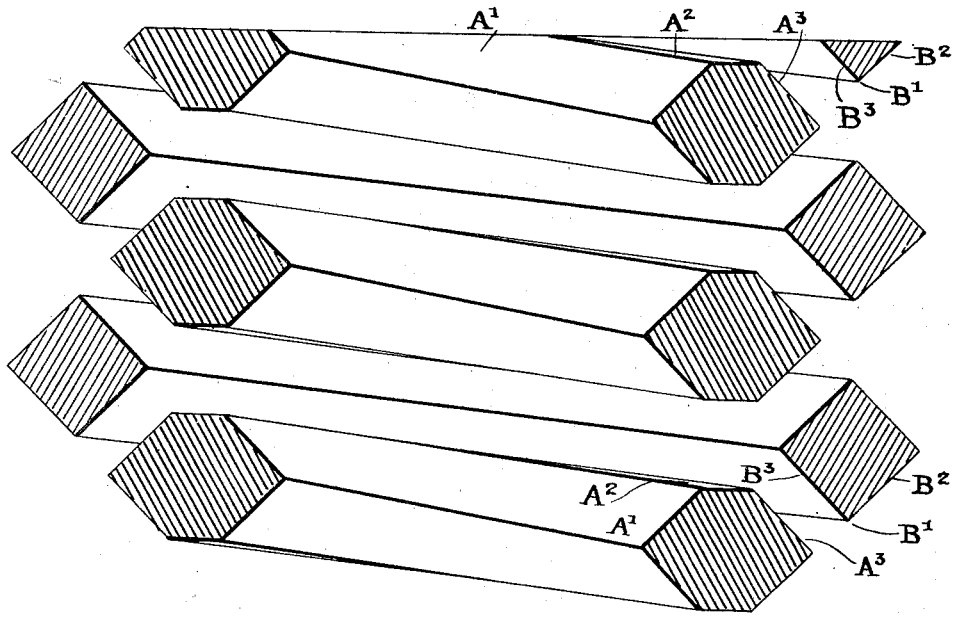
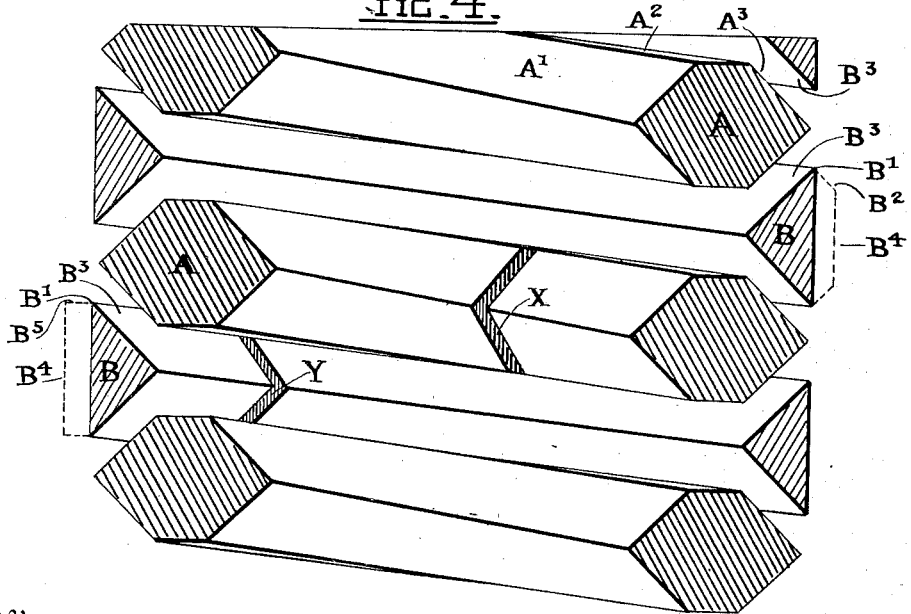
Witnesses
Inventor
GEORGE LYON HARVEY
By his Attorneys No. 758,067.

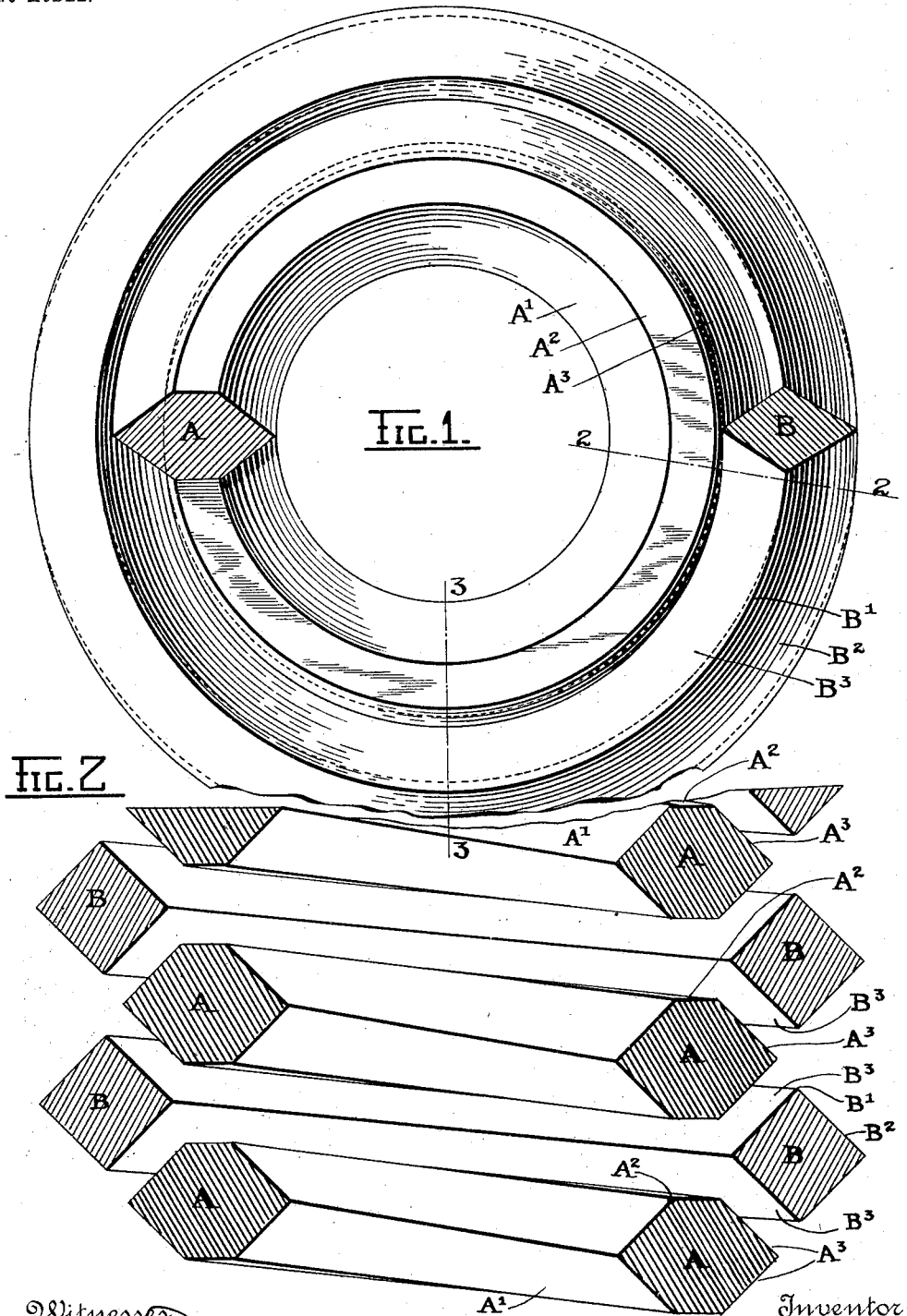

Patented April 26, 1904.

UNITED STATES PATENT OFFICE.

GEORGE LYON HARVEY, OF CHICAGO, ILLINOIS.

FRICTION DEVICE.

SPECIFICATION forming part of Letters Patent No. 758,067, dated April 26, 1904.

Application filed December 26, 1903. Serial No. 186,545. (No model.)

*To all whom it may concern:*

Be it known that I, GEORGE LYON HARVEY, a citizen of the United States, residing at Chicago, in the county of Cook and State of Illinois, (having a post-office address at 175 Dearborn street, Chicago, aforesaid,) have invented certain new and useful Improvements in Friction Devices, of which the following is a full and true description, reference being had to the accompanying drawings, showing embodiments of my invention.

The object of this invention is the production of an exceedingly efficient and economical form of friction device especially useful as a compression-spring for draw-gear for railway-cars; and the improvements consist in the novel features and combinations hereinafter pointed out.

A distinctive feature of my present invention is found in the employment of a yielding member which is elliptical or non-concentric with respect to the axis of the friction device. The said yielding member may be one of two or more, which may be of similar or quite different construction and may be a single ring or a coil of one or more turns, and several said members may be employed in series or in succession and constitute a compound member of the friction device. When inner and outer rings or coils are used, either one or both of the said rings or coils may be elliptical with respect to the axis of the friction device. In the accompanying drawings I have shown a friction device consisting of inner and outer coiled members, the inner member being concentric with respect to the axis of the friction device and the outer member being elliptical with respect to said axis.

Figure 1 is a top view of one form of friction device embodying my present invention. Fig. 2 is a horizontal section on the line 2 2 of Fig. 1. Fig. 3 is a like view on the line 3 3 of said figure. Fig. 4 is a view similar to Fig. 2, but showing modified forms of the outer member of the friction device.

Referring to the illustrated forms of my new friction device, these preferably consist of inner and outer members, both being coils as distinguished from mere rings. As especially shown in Fig. 4, it is not necessary that either of said members shall be a single or continuous coil from end to end of the member. Either or both of the members may consist of a succession of short coils slightly out of contact, as at X and Y, Fig. 4. Preferably both members shall be made of heavy bar metal with adjacent friction contacting faces of the members substantially parallel and at an angle of forty-five degrees with respect to the axis of the friction device. Normally the adjacent coils of both members will be separated, so that under initial compression of the friction device there will be no engagement of the coils. As this compression is continued, however, the adjacent friction contacting faces of the coils come into frictional engagement, with the result that the outer coils in addition to longitudinal compression are radially distorted or expanded, whereby the yielding resistance to the load is increased. The engagement and coöperation of the inner and outer members is more completely explained in the specification of a companion application filed simultaneously herewith for Letters Patent. As hereinbefore stated, the principle distinctive point of my present invention is the employment for either or both of the members of coils or rings which are elliptical with respect to the axis of both members.

Referring to the drawings, A indicates a mainspring made of a succession of coils or rings or of a single coil throughout the length of the spring. The mainspring or its successive coils or rings is shown as being made up of heptagonal-looped metal, two of the flat sides $A^2$ being at right angles to the axis of the spring and with the remaining sides $A'$ $A'$ and $A^3$ $A^3$ at an angle of, say, forty-five degrees with respect to said axis. As shown in the figure, the successive loops or turns of the spring A are normally separated, and where necessary auxiliary means for effecting this result may be provided. Such auxiliary means will not be required when the mainspring is one continuous coil; but whether continuous or not the successive loops or rings of A may be normally held apart by combination with the friction-spring B, hereinafter described.

It will be noticed that the contacting faces $A^2$ $A^2$ of successive loops or rings are substantially parallel. The advantages of such disposition of the faces are fully explained in my copending application aforesaid. It will be obvious, however, that when the spring is compressed and the loops or rings are forced together they will contact solidly and there will not be any slipping of the loops or rings past one another. As a result the spring when fully compressed will be the equivalent of a solid tube under the maximum load and without any tendency to double or buckle.

In addition to the mainspring A there is a friction-spring B. This may be combined in any desired way; but I prefer to place the friction-spring outside of the mainspring, as shown in the drawings. The form of friction-spring which I prefer to employ is a continuous coil or a succession of coils, the several loops or rings of the coil being so formed as to be elliptical or non-concentric with respect to the axis of the friction device.

Referring to the accompanying drawings, B indicates the outer friction-spring, preferably composed of a series of shorter coils divided at Y, Fig. 4. As especially seen in Fig. 1, the coils B are wound non-concentrically or elliptically, the shape of a concentric coil being indicated by dotted lines. The successive rings or coils of the spring B are normally out of contact, as clearly indicated in Figs. 2, 3, and 4, and also normally out of contact with the coils or rings of the mainspring A. I prefer that the friction-spring shall be made of bar metal of either square or diamond section, with two of the sides $B^3$, constituting the friction bearing-surfaces or those with which the mainspring has frictional engagement when compressed, substantially parallel with the friction bearing-surfaces $A^3$ of the mainspring. The outer surfaces of the friction-spring are indicated in Figs. 1, 2, and 3 as $B^2$, while the top edges of the rings or coils are indicated at $B'$. If desired, however, the outer surfaces of the spring B may be parallel with the axis of the spring, for which purpose triangular bar metal may be used to make up the spring, as shown in Fig. 4. The spring may be fashioned as shown by dotted lines at the right-hand side of Fig. 4, wherein $B^4$ indicates the outer surfaces of the spring, or, as indicated at the left-hand side of said figure, the rings or coils may have flat contact-surfaces $B^5$ at right angles to the axis of the friction-spring. In the latter event the flattened surfaces $B^5$ may be utilized to bring the successive rings or coils solidly together, as explained with relation to the spring A. By reference to Fig. 2 the relative position of the inner and outer coils at the line 2 2 of Fig. 1 (or point where both coils are substantially concentric with the axis of the friction device) is shown. The inner edges of the coil B are substantially in line with the central line of the rings or coils of A; but at those points (on a line 3 3 of Fig. 1, fully illustrated in Fig. 3) where the outer rings or coils are non-concentric or elliptical with respect to the axis of the friction device the inner edges aforesaid of the coil B are substantially in line with the outer rim of the flattened portions $A^2$ of the mainspring.

I have found when employing a spring coiled elliptically (or non-concentrically) as one of a pair of inner and outer coils or rings that the surface of contact between the two springs is at first small, and after greater loading the elliptical spring tends to take a form concentric to the axis, with the result of constantly increasing the area of the surfaces in frictional contact until all of the contact-surfaces of both coils are in engagement. Where an elliptical spring is used, the unwinding of the spring does not usually take place until all the contact-surfaces of both coils are in engagement, whereas where a concentric spring is used any movement creating friction results in unwinding the spring. In my device, however, I get all of the frictional action by the circular and elliptical coils taking a similar shape. In action there is no undue unwinding of the friction-coil, which is a very severe strain on the metal and tends to break it, as we only need to bend the coils sufficiently to take up the small difference in the form of the two coils, and this acts upon each ring independently without extending along the entire length of the spring as before. The unwinding action of the elliptical spring, so far as it is used, commences at one end and gradually extends along the entire length of the spring. Another result due to my novel combination is that the frictional surfaces of the adjacent spring come into contact sooner than when two concentric coils are used.

I have found that where a friction device is made up of inner and outer coiled springs there is a tendency for the springs to creep along from one end of the spring in relation to each other—that is to say, after the springs have been put together and loaded once when the load is taken off there is tendency for one spring to creep toward the end of the other, and in case the inner spring creeps to the end of the outer spring and touches the loading surface this inner spring would be bent or broken on the next application of a load. To prevent this creeping, I have provided means, one form of which is described and claimed in my aforesaid companion application.

Where, as shown in the drawings accompanying, one coil is concentric and the other is elliptical, there is some tendency to the creeping above referred to, and it will be advantageous to employ a device to prevent such creeping. If, however, both springs are elliptical with respect to the axis this tendency to creep will be overcome, and the coils will remain in normal position.

As explained and as illustrated in Fig. 4, the friction-spring B may have flattened sides. The advantage of this form is that with a lesser sectional area it gives as much friction contacting surface as the square bar of Figs. 2 and 3 and is more supple and will stand more bending. The more supple the outside spring the greater the distortion that can be given to it. As a result the outside spring can come in contact with the mainspring sooner than when the outer spring is very heavy, as a heavy spring will not take a great distortion. Therefore the travel of the spring can be greater with a section like that shown in Fig. 4, and the friction may act for a much longer time without dangerously distorting the spring than if the outer spring is made of square bar. If the friction-spring is made of square bar, it is necessary in order not to distort the spring too greatly to have the free space between the two springs (before compressing) quite large. This means that the friction takes place very late, much later than it should in a draw-gear, for which my improved friction device is especially useful.

What I claim is—

1. In a friction device, outer and inner spring members, one of said members being concentric with the axis of the coil and the other non-concentric with respect to said axis, substantially as described.

2. In a friction device, outer and inner spring members, one of which is non-concentric with respect to the axis of the coil, substantially as described.

3. In a friction device, outer and inner spring members, one of which is non-concentric with respect to the axis of the coil, and both of which are normally separated but are brought into frictional engagement when the friction device is compressed, substantially as described.

4. In a friction device, outer and inner coiled members, the former of which is non-concentric with respect to the axis of the coil, substantially as described.

5. In a friction device, outer and inner coiled members, one of which is made up of a succession of coils, each of which is non-concentric with respect to the axis of the coils, substantially as described.

6. In a friction device, outer and inner compressible members, one of which in non-concentric with respect to the axis of the friction device, substantially as described.

7. In a friction device, an inner compressible member and an outer compressible coiled member which is non-concentric with respect to the axis of the friction device, substantially as described.

8. In a friction device, an inner coiled member, the adjacent contacting surfaces of which are flattened, and an outer coiled member which is non-concentric with respect to the axis of the inner coil and which is normally separated therefrom, substantially as described.

9. In a friction device, inner and outer coiled members, which members are normally separated but are brought into frictional engagement upon compressing the device, the outer faces of one of said members being substantially parallel with the axis of the friction device, substantially as described.

10. In a friction device, inner and outer coiled members, the coils of one member being composed of triangular bars, and both of said members being normally separated, substantially as described.

11. In a friction device, inner and outer coiled members, one of which is made up of a succession of connected coils forming a continuous bar, and one of which members is non-concentric with respect to the axis of the friction device, substantially as described.

12. In a friction device, inner and outer coiled members, one of which is non-concentric with respect to the axis of the device, the adjacent contact-surfaces of the two members being flattened, substantially as described.

13. In a friction device, a spring made up of a succession of coils each of which is non-concentric with respect to the axis of the coils, the said spring being provided with means for holding the coils in proper alinement when the spring is closed, substantially as described.

14. In a friction device, an outer coiled member, which is non-concentric with respect to the axis of the device, and an inner coiled member which is concentric with respect to the said axis, the whole arranged to cause increase of frictional surface between the two members as the device is compressed, substantially as described.

15. In a friction device, a coiled member which is non-concentric with respect to the axis of the member, and a second member for exerting frictional resistance to the first-named member, the whole arranged to cause increase of frictional surface between the two members as the device is compressed, substantially as described.

16. In a friction device, inner and outer coiled members which are disposed non-parallel with respect to each other, substantially as described.

In witness whereof I have hereunto signed my name this 17th day of December, 1903.

GEORGE LYON HARVEY.

In presence of—
HOWARD SHAW,
HAROLD CLINTON FENEE.